United States Patent [19]

Nobue et al.

[11] Patent Number: 5,423,180
[45] Date of Patent: Jun. 13, 1995

[54] FILTER REGENERATING APPARATUS AND METHOD FOR AN INTERNAL COMBUSTION ENGINE

[75] Inventors: Tomotaka Nobue, Yamatokoriyama; Norihiko Fujiwara, Yamatotakada, both of Japan

[73] Assignee: Matsushita Electric Industrial Co., Ltd., Osaka, Japan

[21] Appl. No.: 184,318

[22] Filed: Jan. 21, 1994

[30] Foreign Application Priority Data

Jan. 20, 1993 [JP] Japan .................... 5-007291

[51] Int. Cl.⁶ ............................................. F01N 3/20
[52] U.S. Cl. ........................................ 60/274; 60/275; 60/286; 60/303
[58] Field of Search ................. 60/272, 273, 274, 275, 60/286, 303, 276, 277; 55/466, DIG. 30

[56] References Cited

U.S. PATENT DOCUMENTS

| | | | |
|---|---|---|---|
| 4,477,771 | 10/1984 | Nagy | 60/274 |
| 4,934,141 | 6/1990 | Olivon | 60/275 |
| 5,074,112 | 12/1991 | Walton | 60/275 |
| 5,087,272 | 2/1992 | Nixdorf | 60/275 |
| 5,195,317 | 3/1993 | Nobue et al. | |

FOREIGN PATENT DOCUMENTS

| | | |
|---|---|---|
| 0506083 | 9/1992 | European Pat. Off. |
| 4021033 | 1/1992 | Germany |
| 61-11416 | 1/1986 | Japan |
| 4094409 | 3/1992 | Japan |
| 4-301121 | 10/1992 | Japan |
| WO90/01618 | 2/1990 | WIPO |

OTHER PUBLICATIONS

EPO Search Report corresponding to European Patent Application No. 94100641.3.

Primary Examiner—Ira S. Lazarus
Assistant Examiner—Daniel J. O'Connor
Attorney, Agent, or Firm—Ratner & Prestia

[57] ABSTRACT

A filter regenerating apparatus for an internal combustion engine is disclosed. The filter regenerating apparatus includes: a heating chamber having a first opening and a second opening; a filter for trapping particulate matter included in the exhaust gas which is discharged from the internal combustion engine and flows into the heating chamber via the first opening portion; a microwave generating device for generating microwave supplied to the heating chamber; a microwave detecting device having a detecting section for detecting the power of the microwave supplied to the heating chamber, the microwave detecting device outputting a detection signal in accordance with the detected power; and a control device for controlling the microwave generation of the microwave generating device in accordance with the detection signal, wherein the heating chamber includes a space into which no exhaust gas flows, the filter is supported against a wall of the heating chamber by a support portion having a heat insulating member, the support portion being positioned in the space into which no exhaust gas flows, and the detecting section of the microwave detecting device is located in the support portion.

12 Claims, 12 Drawing Sheets

FILTER REGENERATING APPARATUS AND METHOD FOR AN INTERNAL COMBUSTION ENGINE

BACKGROUND OF THE INVENTION

1. Field of the Invention

The present invention relates to an apparatus and a method of regenerating a filter for an internal combustion engine provided to trap particulate (particulate matter) included in exhaust gas discharged from a diesel engine, by removing the particulate trapped by the filter in such a manner that the particulate is heated and burnt using a microwave. More particularly, the present invention relates to an apparatus and a method of regenerating a filter, by which heating means and burning means are controlled on the basis of the amount of particulate in the filter during the heating and burning of the particulate.

2. Description of the Related Art

A diesel engine advantageously has higher combustion efficiency and durability as compared with a gasoline engine. On the other hand, the diesel engine has a drawback in that it discharges a large amount of air pollutants. The exhaust gas discharged from the diesel engine includes nitrogen oxide and particulate which is regarded as a significant cause of respiratory illness. For this reason, the regulations of exhaust gas have been made more tight. Against these rigorous regulations, some countermeasures such as an improved combustion method of, for example, delaying the fuel injection time, and a low-sulfurization of light oil are being laid down. Technically, the reduction of the nitrogen oxide and the reduction of the particulate have a trade-off relationship, so that the countermeasures in which the nitrogen oxide is reduced in the vicinity of the engine and the particulate is processed in the exhaust system is currently considered to be the most favorable. There are mainly three kinds of particulate, i.e., SOF (Soluble Organic Fraction), soot, and sulfur compounds. As methods for removing the particulate in the exhaust system, an oxidation catalyst method for reducing SOF, and a method for trapping the particulate with a filter have been developed. The oxidation catalyst method cannot reduce soot, so that it is preferable to use the method using a filter.

However, if the particulate is trapped to the full capacity of the filter, the filter soon becomes clogged. Accordingly, the trapping capability of the filter is lowered and a smooth flow of the exhaust gas is prevented. As a result, the engine output is significantly reduced, or in the worst case, the engine is stopped. Under these circumstances, technological efforts to regenerate the filter have been made worldwide. In the case where the trapped amount is small and the heating is likely to be insufficient, the heated particulate is not completely burnt. This results in an insufficient regeneration. In the case where the trapped amount is large and the heating is likely to be excessive, the filter may be mechanically damaged by the burning at an abnormally high temperature caused by the excess heating. In view of the above cases, the most important practical problem is to ensure the durability of the trapping capability of the filter.

In order to solve the problem, it is necessary to control the operation of the heating means and the supply of gas for burning the heated particulate, based on the heating and burning conditions of the particulate.

It is known that the particulate is burnt at a temperature of 600° C. or higher. As a medium for generating energy to heat the particulate to such a high temperature, various methods have been proposed. Among the proposed methods, a method using a microwave can advantageously reduce the power consumption because the particulate itself is selectively heated.

An apparatus and a method for regenerating a filter by removing the particulate using the microwave as a heating energy is, for example, disclosed in Japanese Laid-Open Patent Publication No. 61-11416. FIG. 12 shows the apparatus disclosed in the above-identified publication. As is shown in FIG. 12, the apparatus includes an engine 1, an exhaust pipe 2, a filter 3, a microwave heating chamber 4, a magnetron 5 as microwave generating means, a microwave shielding device 6 for limiting the microwave heating space, a microwave transmitting device 7 for transmitting the microwave generated by the magnetron 5 to the microwave heating chamber 4, detecting devices 8 and 9, provided in the microwave transmitting paths, respectively, for detecting the microwave supplied to and reflected from the heating chamber 4, and a control device 10 for controlling the operation of the magnetron 5 based on the signals of the detected microwave supplied to and reflected from the heating chamber 4 and the signal indicative of the engine operation time. The apparatus further includes a driving power supply 11, and a muffler 12.

With the above construction, the particulate included in the exhaust gas discharged from the engine is trapped by the filter 3 when the exhaust gas flows through the filter 3. The total amount of the particulate trapped by the filter 3 increases as time elapses. Accordingly, in this process, the magnetron 5 is allowed to operate at a predetermined period in accordance with the output signal from the control device 10. The microwave generated by the magnetron 5 is supplied toward the heating chamber 4. The microwave first enters the heating chamber 4 and reaches a wall of the heating chamber 4 through the interior of the filter 3. Then, the microwave is reflected by the wall of the heating chamber 4 and returned to the magnetron 5. During the transmission of the microwave, the signals of the entering wave into the heating chamber 4 and the reflected wave from the heating chamber 4 are detected. Based on these signals, the change of the microwave characteristics across the heating chamber 4 is measured as a voltage standing-wave ratio.

When the amount of particulate trapped by the filter 3 becomes too large, a load with respect to the engine is increased. In the worst case, the engine may be stopped. Thus, it is necessary to remove the particulate at an appropriate timing. The control device 10 stores the lower limit value of the voltage standing-wave ratio corresponding to a certain amount of the trapped particulate, i.e., the appropriate timing.

When the voltage standing-wave ratio obtained by the detected signals becomes equal to or lower than the lower limit value thereof stored in the control device 10, the output of the magnetron 5 is increased, so as to dielectric-heat the particulate trapped by the filter 3, and also to burn and remove the particulate using the oxygen carried by the exhaust gas. In addition, when the voltage standing-wave ratio during the regeneration reaches or exceeds a predetermined upper limit value thereof, it is detected that the burning and removal of the particulate trapped by the filter 3 is completed, so that the operation of the magnetron 5 is stopped. It is also disclosed that the voltage standing-wave ratio is corrected based on the filter temperature.

The above-described conventional apparatus discloses a method for determining the time at which the filter is regenerated, or a method for determining the time at which the regeneration is terminated. However, the conventional apparatus involves the following problem in the method for controlling the heating, burning, and removal of the particulate.

The problem resides in that the detection signals for determining the time at which the regeneration is terminated are not reliable. This problem may deteriorate the reliability in determining the time at which the next regeneration is started. This problem results from the flow of the exhaust gas through the filter during the dielectric heating by the microwave. The correction of the voltage standing-wave ratio using the filter temperature implies that the trapped amount during the regeneration is fixed. In a method for burning and removing the fixed amount of particulate, when the filter temperature is low, the particulate is subjected to both the heating by the microwave and the cooling by the exhaust gas at the same time. As a result, the particulate in the vicinity of the exhaust-gas upstream side of the filter is not heated to the burning temperature, so as to be left unremoved. The residual particulate in the upstream part of the filter prevents the reflected wave from increasing to a desired level, so that the voltage standing-wave ratio is not increased to the predetermined upper limit value of the voltage standing-wave ratio. Thus, it is difficult to accurately determine the time at which the microwave heating is stopped. When the filter temperature is high (i.e., when the temperature of the exhaust gas is high, and a large amount of particulate is discharged), the heating in the exhaust-gas upstream part of the filter is facilitated, and the particulate in this part enters into a burning condition. In this case, the extent of the burning only depends on the flow amount of the exhaust gas. Therefore, it is impossible to avoid the occurrence of an abnormally high burning temperature. Also, it is impossible to avoid mechanical damage of the filter.

International Publication No. WO 90/01618 shows that the flow amount of the exhaust gas through the filter is reduced during the dielectric heating of the particulate by the microwave. According to the conventional apparatus disclosed in International Publication No. WO 90/01618, the cooling effect by the exhaust gas is reduced when the particulate is initially heated, so that the heating of the particulate in the upstream part of the filter by microwave energy can be facilitated.

In addition, International Publication No. WO 90/01618 discloses that particulate which is previously heated by using the secondary air is burnt. However, as described above, the microwave radiated toward the heating chamber always passes through the filter and reaches a wall of the heating chamber on the opposite side of the filter. This is because the particulate existing in a limited region of the filter cannot absorb all the radiated microwave. Accordingly, the heating chamber may include various regions depending on the electromagnetic field characteristics, such as a particulate trapping region where the temperature rises remarkably, a particulate trapping region where the temperature rises gently, and a region where there is almost no temperature change. It is very difficult to determine the temperature of the particulate which exists in the region where the temperature rises remarkably, especially, the temperature of the particulate which exists in the upstream part of the filter, based on the above-mentioned voltage standing-wave ratio or a reflection coefficient which is extracted from the electromagnetic characteristics across the heating chamber.

Therefore, it is difficult to optimally control the time period for initially heating the particulate, and it is difficult to ensure that the occurrence of any abnormally high burning temperature caused by the supply of exhaust gas or secondary air is avoided, so as to effect stable burning.

In a case where the particulate is burnt by supplying secondary air, the control related to the termination of the secondary air supply is important. However, in the prior art technique, the control is not reliable. Accordingly, there may be a possibility that the exhaust gas of a low temperature is caused to flow through the filter which is in a high temperature condition by the burning particulate. This may result in mechanical damage of the filter due to the thermal stress caused in the filter by the flow of the exhaust gas of the low temperature.

U.S. Pat. No. 5,195,317 proposes an apparatus for detecting the change of electromagnetic distribution in the heating chamber caused by the change in the effective dielectric constant and dielectric loss of the filter along with the increase in the amount of trapped particulate.

However, the detecting section of the apparatus is constructed in such a manner that a slit is provided on the wall of the heating chamber, and the microwave passing through the slit is detected by an antenna. Thus, the construction of the detecting section includes the formation of the slit. This means that the construction of the detecting section is somewhat complicated and large-sized. Moreover, when a plurality of detecting sections are disposed, there arises a problem in that they cannot be arranged close to each other.

SUMMARY OF THE INVENTION

The filter regenerating apparatus for an internal combustion engine of this invention includes: a heating chamber having a first opening portion and a second opening portion; a filter for trapping particulate matter included in the exhaust gas which is discharged from the internal combustion engine and flows into the heating chamber via the first opening portion; microwave generating means for generating microwave supplied to the heating chamber; microwave detecting means having a detecting section for detecting the power of the microwave supplied to the heating chamber, the microwave detecting means outputting a detection signal in accordance with the detected power; and control means for controlling the microwave generation of the microwave generating means in accordance with the detection signal, wherein the heating chamber includes a space into which no exhaust gas flows, the filter is supported against a wall of the heating chamber by a support portion having a heat insulating member, the support portion being positioned in the space into which no exhaust gas flows, and the detecting section of the microwave detecting means is located in the support portion.

In one embodiment of the invention, the filter regenerating apparatus further includes air supplying means for supplying a gas containing oxygen to the heating chamber via the second opening portion, wherein the control means controls the air supplying means to supply the gas to the heating chamber in accordance with the detection signal.

In another embodiment of the invention, the gas supplied by the air supplying means is the exhaust gas discharged from the internal combustion engine.

In another embodiment of the invention, the air supplied by the air supplying means is an atmospheric gas existing on the outside of the apparatus, and the air supplying means supplies the atmospheric gas to the heating chamber without passing through the internal combustion engine.

In another embodiment of the invention, the microwave detecting means outputs the detection signal several times before the air supplying means is started and when the microwave generating means generates the microwave, and wherein the control means starts the air supplying means when the detection signals substantially coincides with a predetermined value.

In another embodiment of the invention, the control means stores at least one predetermined value, and the microwave detecting means detects the power of microwave at a period which is shortened as the detection signal comes close to the predetermined value.

In another embodiment of the invention, the control means determines a time at which one of the detection signals substantially coincides with the predetermined value based on the detection signals, and starts the air supplying means at the time.

In another embodiment of the invention, the filter regenerating apparatus further includes abnormal occurrence warning means for generating a warning signal, wherein the abnormal occurrence warning means generates the warning signal under the control of the control means when the detection signal does not fall within a predetermined range.

In another embodiment of the invention, the microwave detecting means has a coaxial line, and the detecting section is formed of a central conductor of the coaxial line.

According to another aspect of the invention, a method for removing particulate matter from a filter is provided. The method is used in a filter regenerating apparatus for an internal combustion engine including: the filter for trapping the particulate matter included in the exhaust gas which is discharged from the internal combustion engine; microwave generating means for generating microwave for heating the filter; microwave detecting means for detecting the power of the microwave which changes depending on the amount of particulate trapped by the filter; and control means for controlling the microwave generation of the microwave generating means. The method includes: a first stage for dielectric-heating the particulate trapped in the filter by the microwave; a second stage for burning the particulate by supplying a gas containing oxygen to the filter, while heating the filter by the microwave; and a third stage for stopping the heating of the filter by the microwave, and then supplying the air containing oxygen to the filter.

In one embodiment of the invention, the control means commences the second stage based on the power of the microwave detected by the microwave detecting means in the first stage.

In one embodiment of the invention, the control means commences the third stage based on the power of the microwave detected by the microwave detecting means in the second stage.

Thus, the invention described herein makes possible the advantages of (1) providing an apparatus and a method of regenerating a filter for an internal combustion engine, which can accurately measure the amount of particulate during both the trapping period and the heating and burning period in the filter, and can remove the particulate by controlling the operations of the heating means and the gas supplying means based on the signals corresponding to the amount of the trapped particulate, so as to ensure the regeneration reliability of the filter trapping capability, and (2) providing an apparatus in which an assembling efficiency of the detecting means is improved, and the detecting means can be inexpensively produced.

According to the filter regenerating apparatus of the invention, the following effects can be attained.

(1) The detecting section of the microwave detecting device is surrounded by the thermally insulating member in the space through which the exhaust gas does not pass, so that the detecting section will not be polluted by the exhaust gas, and the detecting section can be protected from the heat of the exhaust gas. Therefore, the detecting section can always accurately detect the microwave power corresponding to the amount of particulate trapped by the filter, so that the control device can properly control the microwave generating device, the air supplying device, and the several valves.

(2) Since the period for detecting the microwave power can be varied, and especially the period is shortened as the detection signal comes close to the predetermined value which are stored in the control means, the distribution and the change of microwave power in the heating chamber can be accurately transmitted to the control device via the detection signal. As a result, the control device can control the microwave generating device, the air supplying device, and the several valves at appropriate timings based on the accurate measurement of the amount of particulate deposited on the filter, the burning condition, and the burning region.

(3) The microwave power can be detected at a plurality of different times, so that the distribution and the change of microwave power in the heating chamber can be accurately transmitted to the control device via the detection signal. As a result, the control device can control the microwave generating device, the air supplying device, and the several valves at appropriate timings based on the accurate measurement of the amount of particulate deposited on the filter, the burning condition, and the burning region.

(4) Since the microwave detecting device includes the coaxial line and the detecting section is formed of a central conductor of the coaxial line, the device can easily be attached to the heating chamber. Thus, the apparatus can have a simple structure and can be inexpensively produced.

For the above reasons, according to the filter regenerating apparatus of this invention, the particulate or the like included in the exhaust gas trapped by the filter can be surely and efficiently removed at an appropriate time. In addition, according to the filter regenerating apparatus of this invention, the disruption of burning and abnormally high burning temperature of the particulate can be avoided during the filter regeneration, so that the mechanical damage to the apparatus can be prevented, and lowering of the power of the engine and the stopping of the engine can also be prevented. Moreover, the filter regenerating apparatus of the invention can efficiently regenerate the filter, so that the electric power consumption for the filter regeneration can be minimized. The filter regenerating apparatus of this invention has a simple structure, so that the assembly and repairing of the apparatus can be easily performed, and the apparatus can be produced at a low cost. As a result, the apparatus of this invention is suitable for being mounted on an automobile. Furthermore, the apparatus of this invention judges the amount of particulate which is not burnt and left unremoved. Thus, when burning failure of particulate occurs, the apparatus can immediately warn the user of the abnormal occurrence. Therefore, the user can perform the maintenance of the apparatus at an appropriate time.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Hereinafter, the first example of the filter regenerating apparatus for an internal combustion engine according to the invention will be described with reference to the accompanying drawings.

Figure 1:
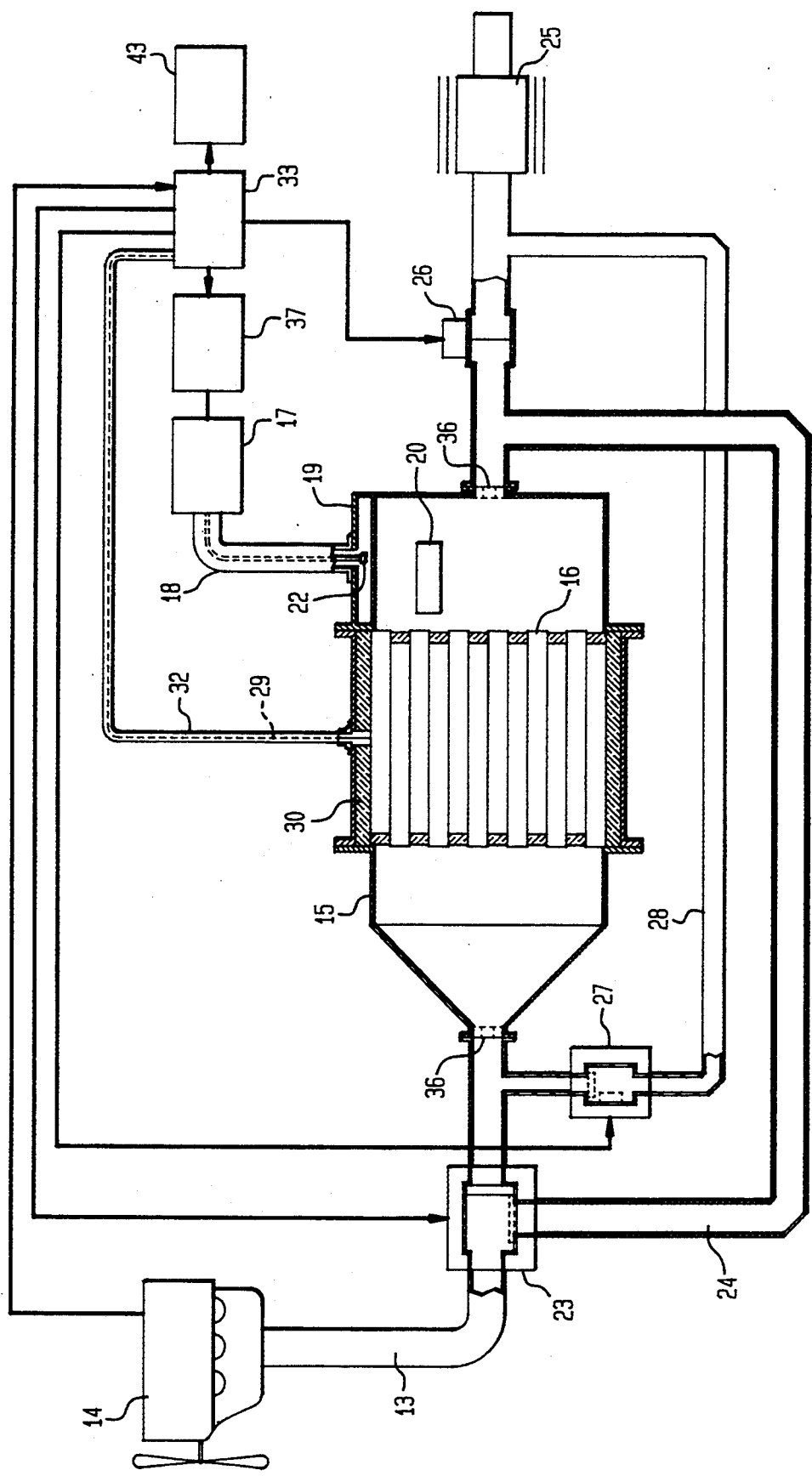
FIG. 1 shows the construction of an apparatus for regenerating a filter for an internal combustion engine in the first example according to the invention.
Figure 2:
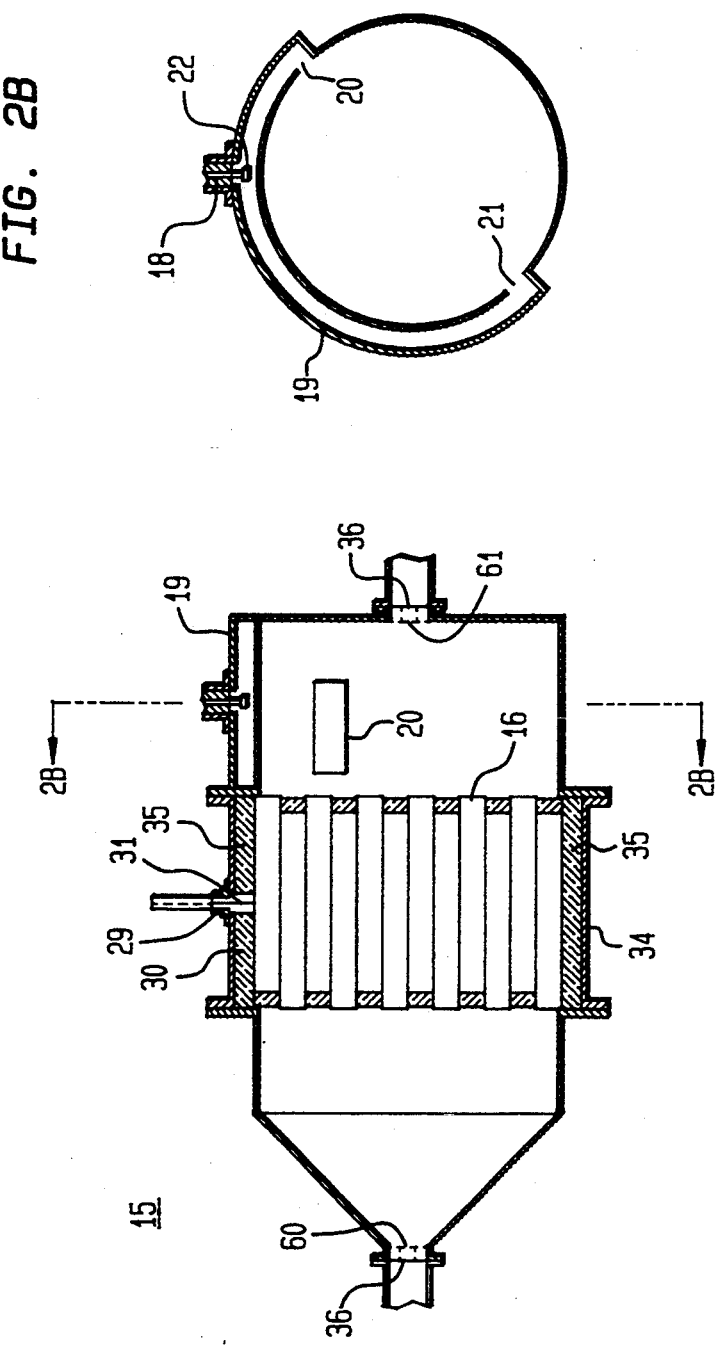
FIG. 2A shows an exploded view of the heating chamber of FIG. 1.
FIG. 2B is a cross-sectional view of the heating chamber of FIG. 2A, taken along the line 2B—2B.

As is shown in FIGS. 1, 2A and 2B, the first example according to the invention includes a heating chamber 15 having a first opening 60 and a second opening 61, and a filter 16 provided in the heating chamber 15 for trapping a particulate included in the exhaust gas. The heating chamber 15 is connected to an exhaust pipe 13 for discharging exhaust gas from an internal combustion engine 14 through the openings 60 and 61. The first example according to the invention further includes a microwave generating device 17, a microwave detecting device 29, and a control device 33. The microwave generating device 17 generates the microwave which is supplied to the heating chamber 15 for burning the particulate trapped by the filter 16. The microwave detecting device 29 includes a detecting section 31 for detecting the microwave power which varies depending on the amount of particulate trapped by the filter 16. The microwave detecting device 29 generates a detection signal in accordance with the microwave power detected by the detecting section 31. The control device 33 controls the microwave output generated from the microwave generating device 17 in accordance with the detection signal.

The heating chamber 15 includes a space 30 between a wall 34 of the heating chamber 15 and the filter 16. Through the space 30, no exhaust gas passes. The detecting section 31 of the microwave detecting device 29 is located in the space 30. The filter 16 has a honeycomb structure. The microwave detecting device 29 has a coaxial line portion 32 having a coaxial structure. The detecting section 31 consists of a tip having a predetermined length of the central conductor of the coaxial line portion 32 extends into the space 30 through which no exhaust gas passes. The signal detected by the detecting section 31 is transmitted to the control device 33 via the microwave detecting device 29.

The microwave energy generated by the microwave generating device 17 is supplied to the heating chamber 15 through a coaxial transmission line 18, a tubular waveguide 19, and coupling holes 20 and 21.

The exhaust gas discharged from the internal combustion engine 14 is usually allowed to flow toward the filter 16 through the first opening 60. When the filter 16 is to be regenerated, a switching valve 23 is controlled by the control device 33, so that the exhaust gas is allowed to flow through a by-pass pipe 24. In the vicinity of an exhaust port of the exhaust pipe 13, a muffler 25 is located. During the regeneration of the filter 16, the opening ratios of valves 26 and 27 are controlled by the control device 33, so that a gas containing oxygen ($O_2$) which facilitates the burning of the particulate trapped by the filter 16 is introduced into the heating chamber 15 through the second opening 61. In the first example, the exhaust gas is used for the gas for facilitating the burning of the particulate. During the regeneration of the filter 16, the gas introduced into the heating chamber 15 is discharged through an exhaust pipe 28.

The filter 16 is supported at the wall in a thermally insulating manner, by means of a support portion 35 without gas permeability provided in the space 30. The exhaust gas flowing into the heating chamber 15 cannot reach the muffler 25 without passing through the filter 16. That is, the exhaust gas will not flow into the space 30. The wall 34 of the heating chamber 15 is thermally insulated from the filter 16 by the support portion 35 having a heat insulating portion. Accordingly, the wall 34 and the detecting section 31 cannot be heated to an abnormally high temperature due to the high temperature generated in the filter 16 during the regeneration thereof. Therefore, the detecting section 31 located in the support portion 35 is not exposed to the exhaust gas, and hence is protected from the temperature variation of the exhaust gas and the high temperature conveyed from the filter 16. The support portion 35 may be formed by laminating a mat material having thermal expansibility such as INTERAM (trade mark, manufactured by 3M company) or by laminating a thermal-insulating material such as quilting-type MICROTHERM (trade mark, manufactured by Japan Microtherm Inc.).

The microwave characteristics in the heating chamber 15 vary with the amount of particulate trapped by the filter 16. The variation of the microwave characteristics is detected by the detecting section 31 of the microwave detecting device 29. The microwave detecting device 29 including the detecting section 31 is not exposed to the exhaust gas, and is protected from the temperature variation of the exhaust gas and the high temperature conveyed from the filter 16. With this construction, the microwave detecting device 29 can accurately detect the microwave characteristics. Thus, the microwave detecting device 29 detects the amount of particulate deposited on the filter 16, the region where the particulate is burnt, and the region where particulate is not burnt and left in the filter 16, with high accuracy.

The microwave supplied into the heating chamber 15 is confined substantially within the heating chamber 15 by a microwave shielding device 36 having a honeycomb structure. The microwave shielding device 36 may have another structure having a plurality of holes such as a porous structure.

The microwave generating device 17 is driven by a driving power supply 37. The control device 33 receives a signal indicative of the rate of rotation of the internal combustion engine 14.

The control device 33 previously stores a microwave power value corresponding to an appropriate amount of particulate trapped by the filter 16, as a reference signal value. The control device 33 allows the microwave generating device 17 to operate at appropriate intervals during the operation of the internal combustion engine 14. In the operation of the microwave generating device 17, the control device 33 compares the signals including the information on the particulate amount detected by the microwave detecting device 29 with the reference signal value. This comparison is more frequently performed as the detected signal value output from the microwave detecting device 29 becomes close to the reference signal value. In this way, the timing for regenerating the filter 16 can be accurately adjusted to the timing at which the amount of particulate trapped by the filter 16 becomes extremely close to the appropriate amount corresponding to the reference signal value.

The microwave radiated from the antenna 22 is supplied to the heating chamber 15 through the coupling holes 20 and 21 of the waveguide 19 provided on the wall of the heating chamber 15. The coupling holes 20 and 21 are located in such a manner that the microwave is supplied to the heating chamber 15 with a phase difference of 180°.

The exhaust gas discharged from the internal combustion engine 14 usually flows into the filter 16 through the exhaust pipe 13 and the first opening 60. The filter 16 has a honeycomb structure of a Wall-flow type, and has an ability for trapping particulate included in the exhaust gas. As the amount of the particulate trapped by the filter 16 increases, the pressure in the heating chamber 15 and the exhaust pipe 13 is raised, and the load to the internal combustion engine 14 is increased. In the worst case, the engine may be stopped. Therefore, it is necessary to remove the particulate trapped by the filter 16 at an appropriate time.

The appropriate time is determined by the control device 33 based on comparison between the detection signal and the reference signal value previously stored in the control device 33. By this determination, when the value of the detection signal becomes to the reference signal value, the microwave is supplied from the microwave generating device 17 to the heating chamber 15, so as to heat and burn the particulate deposited on the filter 16. The process for burning the particulate for removal is referred to as the filter regeneration.

Next, referring to FIGS. 3, 4, 5 and 6, the detecting section 31 of the microwave detecting device 29 for detecting the microwave power in the heating chamber 15 will be described in detail.

Figure 3:
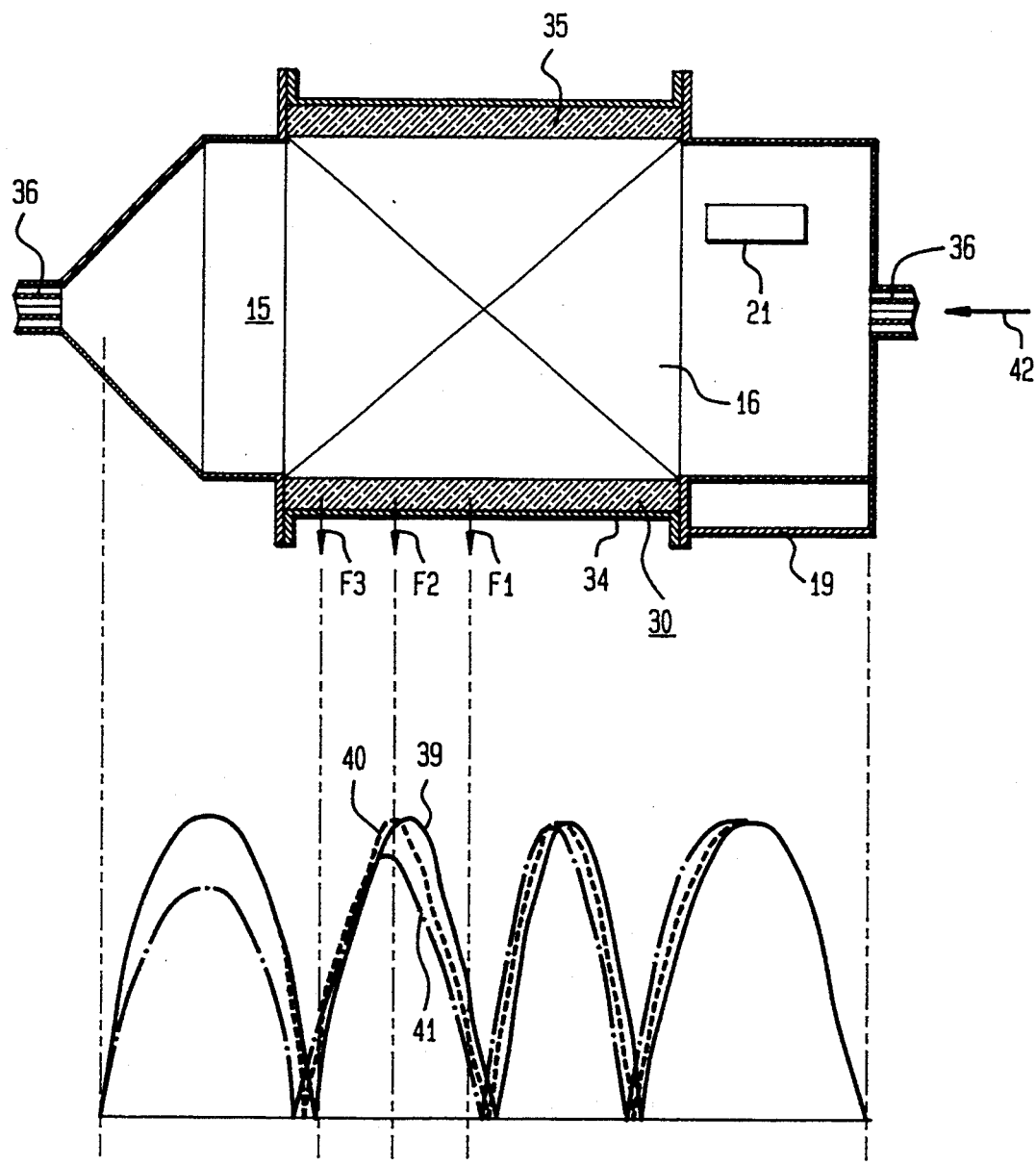
FIG. 3 shows the microwave electric field distribution characteristics in the heating chamber shown in FIG. 1.

Curves 39, 40 and 41 in FIG. 3 show the electric field distribution of the microwave in the heating chamber 15. The microwave in the heating chamber 15 is excited in the TE (Transverse Electric) mode. In a space in which the filter 16 exists, due to the dielectric properties of the filter material and the particulate trapped by the filter, the wavelength of the microwave is shortened compared with a space in which the filter 16 does not exist. The electric field distribution of the microwave with respect to a certain amount of trapped particulate is indicated by the solid line curve 39. Thereafter, the amount of trapped particulate is increased, the wavelength of the microwave in the filter 16 is further shortened, and the electric field distribution of the microwave is shown by the broken line curve 40. Thereafter, the amount of trapped particular is further increased, the microwave is further absorbed in the filter 16, and the electric field distribution of the microwave is indicated by the dot-chain line curve 41.

Figure 4:
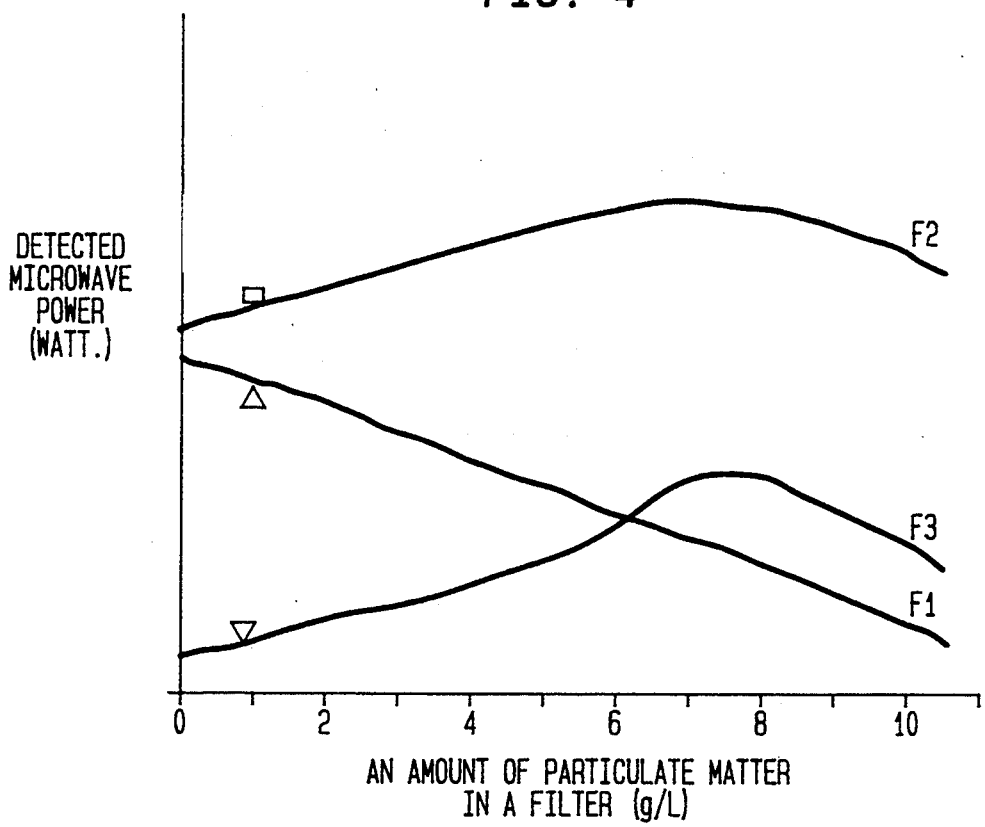
FIG. 4 shows the characteristics of the microwave power detected at various detecting positions with respect to the trapped amount of particulate in the filter.

FIG. 4 shows the detection signal values output from the microwave detecting device 29 when the power value of the microwave which exhibits the electric field distributions shown in FIG. 3 is detected at three detecting positions (F1, F2 and F3) in the heating chamber 15, As the amount of trapped particulate increases, the effective dielectric constant of the filter 16 is increased. Accordingly, the wavelength of the microwave is shortened, and the characteristics of the microwave exhibit different variations at the respective detecting positions.

As is shown in FIG. 4, the amount of particulate trapped by the filter 16 exceeds 8 g/L (L denotes a volume of the filter 16), all the microwave power values detected at the respective detecting positions are reduced. Since the accumulation and absorption of the microwave power in the filter 16 is increased by the increase of the dielectric constant and the dielectric loss in the filter 16, the microwave power value is reduced in the space 30 including the support portion 35 provided on the outer surface of the filter 16. As is shown in FIG. 4, the power value characteristics detected at the detecting positions F2 and F3 have respective peaks. The power value detected at the detecting position F1 continues to be reduced with the increase of the amount of trapped particulate. This proves that, in order to accurately determine the amount of particulate trapped by the filter 16, it is necessary to select the detecting position F1.

The detecting position F1 can be determined depending on the electric field distribution of the microwave produced in the heating chamber 15. As is shown in FIG. 3, the position of the detecting position F1 is deviated from the position of the node of standing-wave distributed in the heating chamber 15 by an appropriate distance in the direction indicated by an arrow 42. However, the position of the detecting position F1 will not overlap the antinode of standing-wave. As described above, the position of the detecting position F1 will not coincide with the node of standing-wave and the antinode of standing-wave, even when the amount of particulate trapped by the filter 16 changes variously. The arrow 42 indicates the direction from the muffler 25 to the switching valve 23. The optimal value of the deviation of the detecting position F1 from the node of standing-wave can be determined by the dielectric characteristics of the filter material and the filter volume L.

Figure 5:
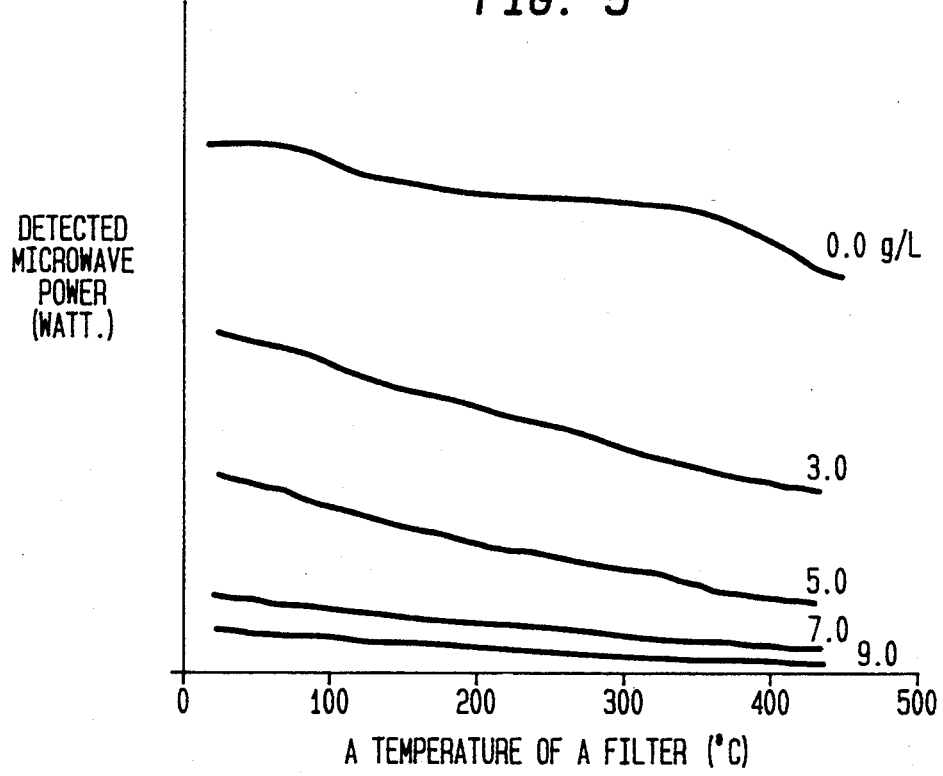
FIG. 5 shows the characteristics of the microwave power detected at the detecting position F1 in FIG. 3 with respect to the filter temperature.

Next, FIG. 5 shows the characteristics of the microwave power detected by the detecting section 31 located at the detecting position F1 with respect to the temperature of the filter 16. In FIG. 5, the temperature characteristics are shown in five cases of different amounts of particulate trapped by the filter. The characteristics are measured by varying the temperature of the entire filter in such a manner that the air with various different temperatures are provided to the filter with each amount of particulate. The dielectric loss of the ceramic material as the filter material increases when the temperature of the filter becomes 350° C. or higher, so that the microwave power value detected by the detecting section 31 is reduced. The exhaust gas varies in its temperature by about 100° C. to several hundreds of degrees (°C.). Accordingly, when the temperature of the exhaust gas is high, the detection signal obtained at the detecting position F1 indicates a signal corresponding to an amount which is larger than the actual amount of particulate trapped by the filter. However, in view of the practical environment, the temperature of the exhaust gas is around 200° C. By judging from the temperature characteristics of the microwave power shown in FIG. 5, when the temperature of the exhaust gas is in the range of 100° to 300° C., the detection accuracy of the amount of trapped particulate is about 2 g/L. When the engine is operated with high load, the exhaust gas has high temperatures of 300° C. or higher. The case where the exhaust gas with such high temperatures are discharged for a long time is rare. Therefore, by use of the detection signal of microwaves at appropriate periods, the amount of trapped particulate can be corrected based on the variation in the detection signal. In addition, even in a case where the temperature of the exhaust gas is around 200° C., when the amount of trapped particulate is about 7 g/L or more, the detection accuracy is lowered. In order to correct the above reduction in the detection accuracy, the apparatus of this example can shorten the detection period as the amount of trapped particulate increases.

In this example, the detecting section 31 of the microwave detecting device 29 is located at the detecting position F1 which is determined in the above-described manner, so that the amount of particulate trapped by the filter 16 can be accurately detected over wide range of the amounts.

Figure 6:
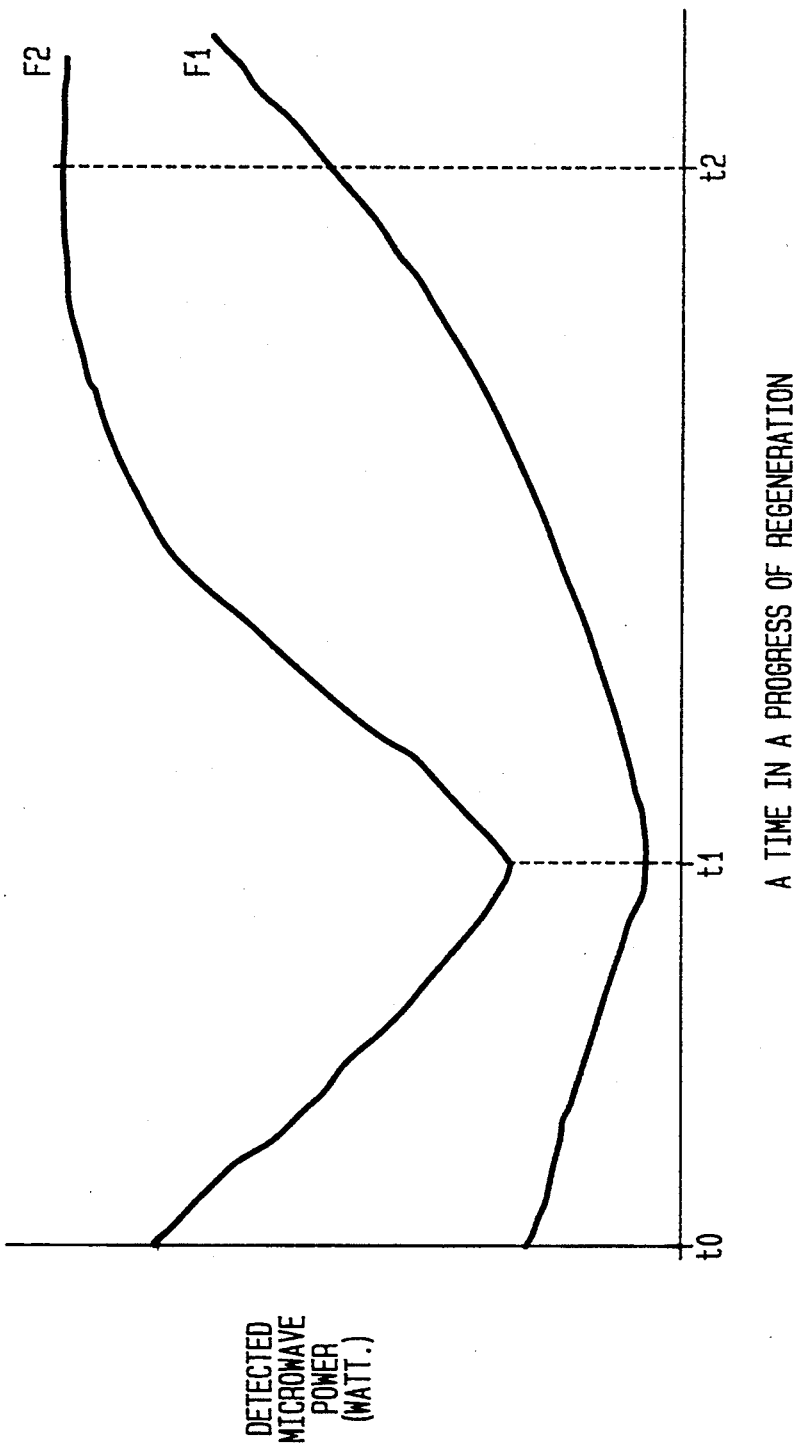
FIG. 6 shows the change characteristics along the time axis of the microwave power detected at each detecting position during the regeneration.

FIG. 6 shows the change of the microwave power detected at the detecting positions F1 and F2 shown in FIG. 3 along time axis during the filter regeneration. As the particulate trapped by the filter 16 is dielectric-heated by continuously operating the microwave generating device 17, the detected microwave power at each detecting position decreases as is shown in FIG. 6. FIG. 6 shows the characteristics in the case where the filter temperature before the regeneration is 200° C., and the trapped amount is 7 g/L.

The particulate is burnt at about 600° C. or higher, so that it is necessary to set an appropriate initial heating period. In this initial heating period, the particulate is selectively heated by the microwave energy, and the temperature of the filter 16 itself also rises due to the conveyance of heat along with the temperature rise of the particulate. The temperature rise of both the particulate and the filter 16 causes their dielectric loss to increase, so that the microwave power in the peripheral portion of the filter 16 is reduced as is shown in FIG. 6. After the appropriate time period has elapsed, the particulate is heated to a temperature at which it can be burnt (at time t1 in FIG. 6). The time t1 can be determined by calculation in the control device 33 based on the absolute value of the detected microwave power or the changed amount of particulate from the start of the dielectric heating. It has been confirmed by experiments that thereafter, when gas containing oxygen is supplied to the heated particulate, the detection signal at each detecting position changed due to the increasing characteristics. In addition, it has been confirmed by experiments that the change of the detection signal to the increasing characteristics is equivalent to the transition of the particulate into the burning condition. After the initial heating period in which the detected microwave power is reduced to a predetermined level, the particulate is changed into a burning condition. At this time, the gas containing oxygen is allowed to flow to the filter 16 by the control device 33.

FIG. 6 shows the characteristics in the case where the gas for facilitating the burning is supplied in the direction indicated by the arrow 42 in FIG. 3. When the particulate starts to be burnt, the particulate becomes gases and are then removed. Thus, the amount of particulate trapped in the filter 16 is decreased and the dielectric loss in the filter 16 is also decreased. As a result, the microwave powers detected at the detecting positions F1 and F2 are incremented.

The increment of the microwave power is saturated at the detecting position F2 after an appropriate time period has elapsed (at time t2 in FIG. 6). The inventors of this invention have confirmed that in the regeneration experiments, when the filter end face which is remote from the microwave supplying side enters into the burning condition, the detection signal at the detecting position F2 becomes saturated. That is, the time t2 corresponds to the time at which almost all the particulate trapped in the filter 16 is burnt and removed, and only the remaining very small amount of particulate is still in the burning condition. As a result, the amount of particulate in the filter 16 becomes very small (there may be unremoved residue). However, the temperature of the filter 16 itself is still high, so that the microwave loss in the filter 16 is still very large. The gas which is allowed to flow into the filter 16 for facilitating the burning usually has temperatures lower than the filter temperature, so that the filter 16 is gradually cooled by the gas for facilitating the burning after the completion of burning. Due to this phenomenon, the microwave power at each detecting position after the time t2 is incremented or decremented depending on the detecting position (see FIG. 4). Based on such a change in characteristics of the microwave power, the operation of the microwave generating device 17 can be stopped. The stop time coincides with the time at which the detection signal finds the saturated condition, based on the signal change of the microwave power detected at the detecting position F2 (the time t2 in FIG. 6). On the other hand, the completion of the particulate burning can be judged by detecting that the absolute value of the detection signal at the detecting position F1 becomes a predetermined value or more.

In FIG. 1, a single microwave detecting device 29 and a single detecting section 31 are shown. Alternatively, by providing a plurality of detecting devices and detecting sections, it is possible to utilize the signal change characteristics detected by the detecting section located at the detecting position F2. In such a case where a plurality of detecting devices and sections are provided, it is effective to dispose them parallel to the direction in which the exhaust gas flows through the filter, when the microwave is excited in the TE mode.

In FIG. 4, symbols $\Delta$, $\square$ and $\nabla$ indicate the microwave power values when the microwave power values are detected for the respective filter samples after the burning and removal of the particulate. Depending on the positions of the symbols $\Delta$, $\square$ and $\nabla$ on the graphs in FIG. 4, it is possible to determine the amount of particulate which is not burnt and left unremoved in the filter 16 after the burning and removal of the particulate. In addition, it is possible to judge whether the filter is well regenerated or not, based on the level of the microwave power corresponding to the unremoved amount of particulate. The apparatus of this example includes an abnormal occurrence warning device 43 (see FIG. 1). When the unremoved amount is too large, the abnormal occurrence warning device 43 determines the conditions as being abnormal, so as to warn the user of the abnormal occurrence by means of a warning lamp, a warning buzzer, or the like. By such warning, the user appropriately performs the maintenance of the filter and portions of the regenerating apparatus.

Figure 7:
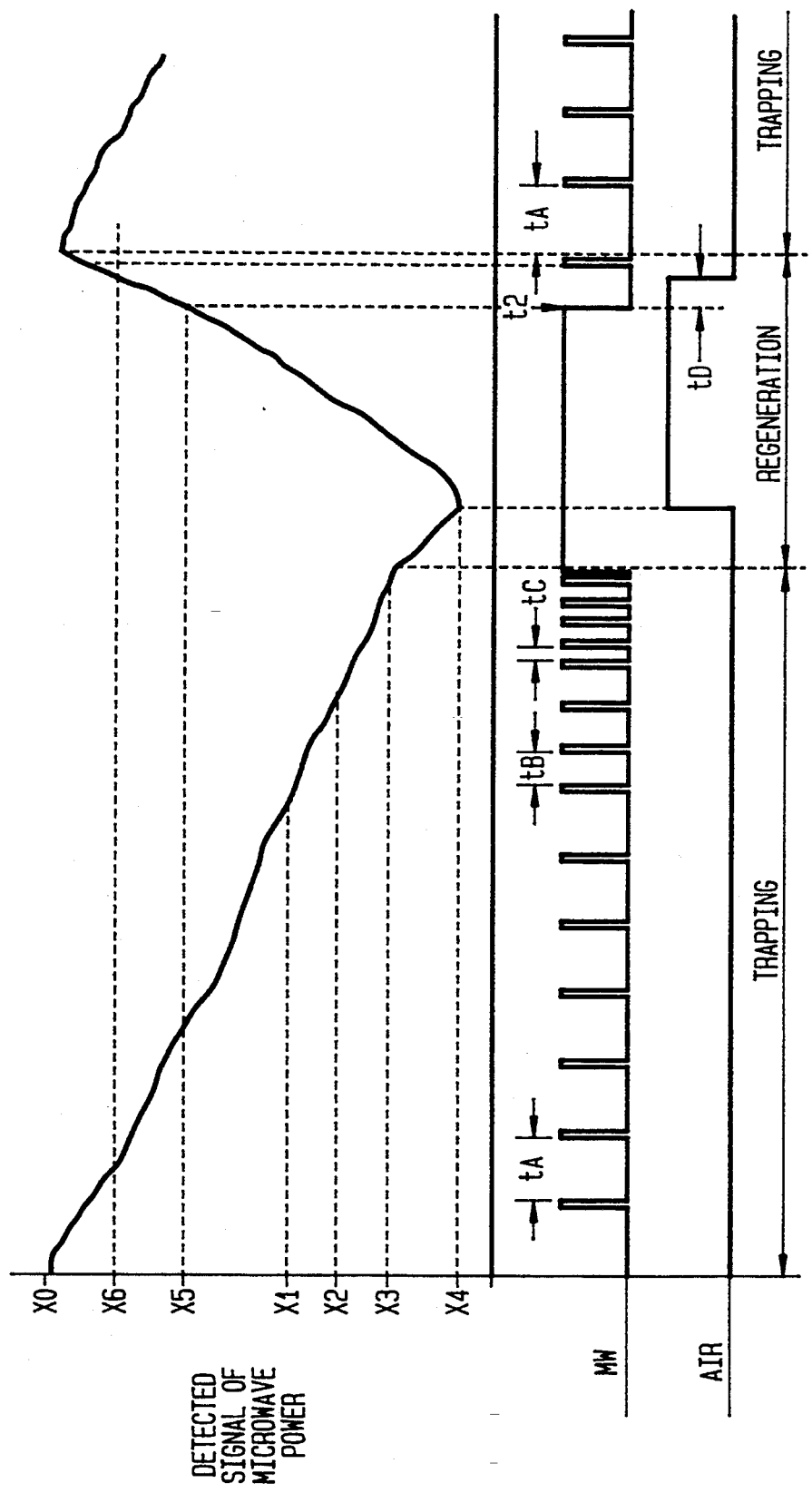
FIG. 7 is a time chart for a control method for the trapping and the regeneration of the filter used for the internal combustion engine in the first example of the invention.
Figure 8A:
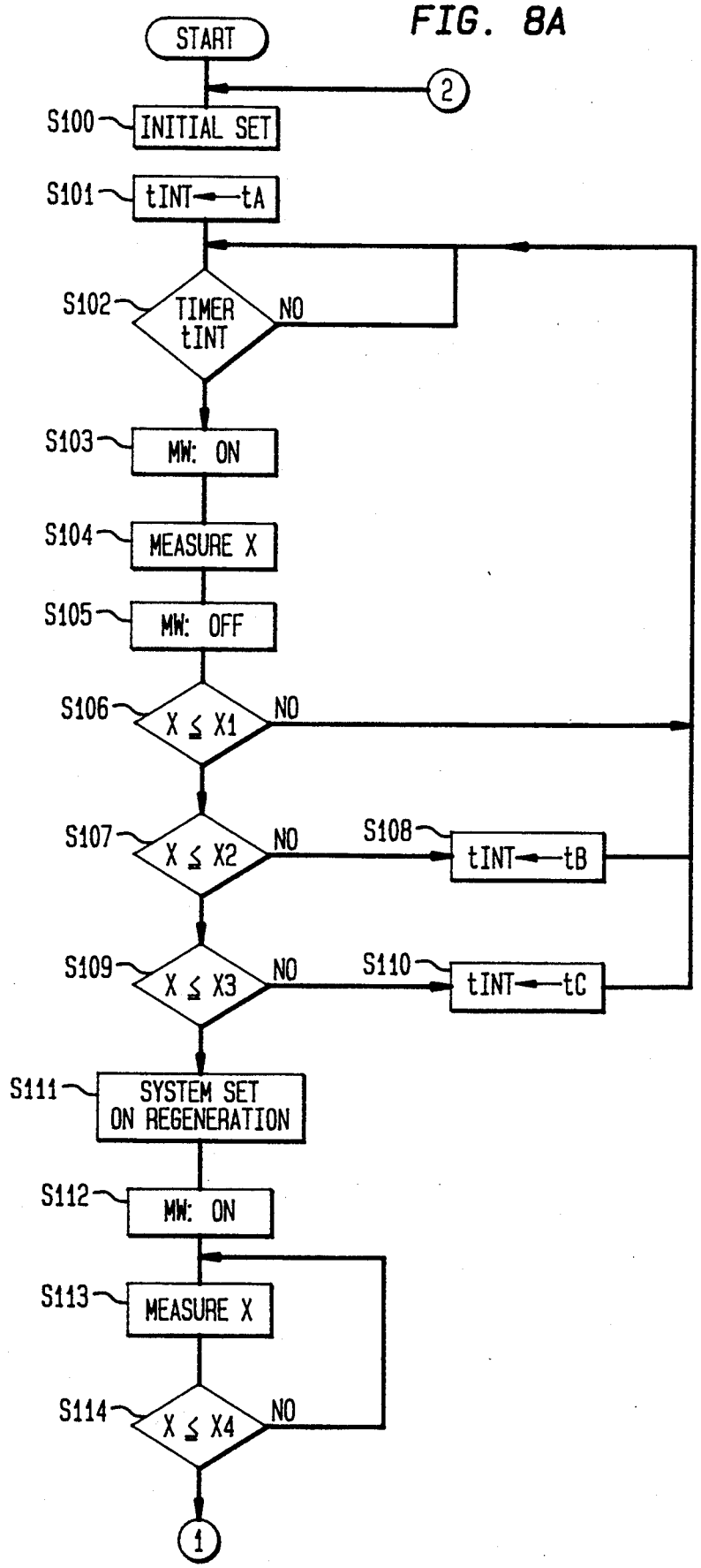
FIGS. 8A and 8B are flowcharts showing the control program used in the trapping and in the regeneration of the filter used for the internal combustion engine in the first example of the invention.
Figure 8B:
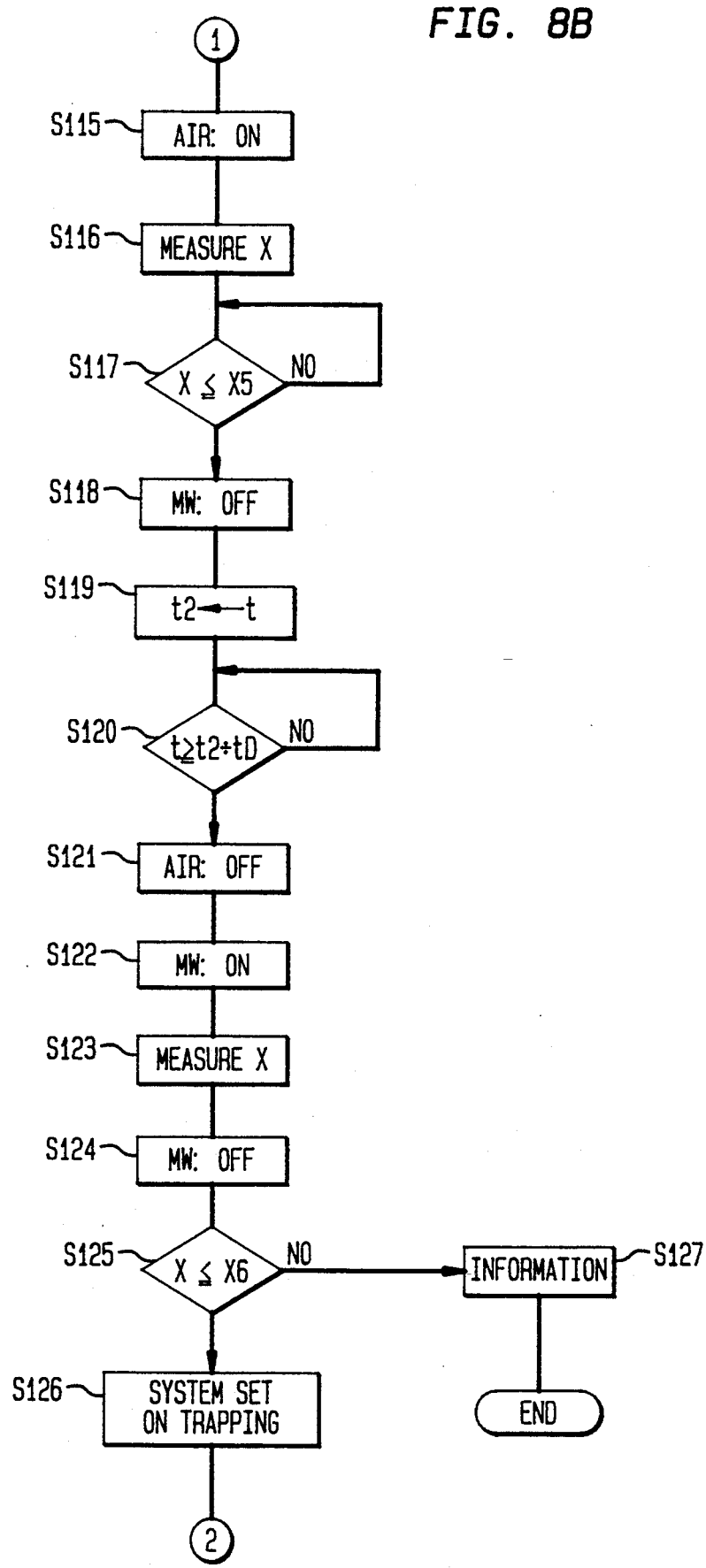

Hereinafter, the main control method for the filter generation utilizing the change of the detection signal (microwave power value) obtained by the microwave detecting device 29 will be described with reference to FIGS. 7, 8A and 8B.

Herein, the control method is described in an exemplary case where the detecting section 31 of the microwave detecting device 29 is provided only at the detecting position F1 in FIG. 3.

First, the trapping control is described. Each control command is generated from the control device 33. In the initial setting at step S100 in FIG. 8A, the control device 33 controls the switching valve 23 to allow the exhaust gas to flow into the heating chamber 15 through the first opening 60, and controls the valves 26 and 27 to be opened and closed, respectively, for controlling the flow of the exhaust gas. In step S101, a first period tA (e.g., 30 minutes) is set as a time period tINT for operating the microwave generating device 17. In step S102, the apparatus waits until the time at which the microwave generating device 17 is to be operated again. In this case, the waiting time period is tA. When the waiting time period has elapsed, the process proceeds to step S103. In step S103, the microwave generating device 17 is operated, and the process proceeds to step S104. In step S104, the microwave detecting device 29 detects the microwave power amount (hereinafter, referred to as a detection signal) X generated in the vicinity of the detecting section 31 in the heating chamber 15 during the operation of the microwave generating device 17. When the control device 33 receives the detection signal X, the process proceeds to step S105 in which the operation of the microwave generating device 17 is stopped.

The control device 33 compares the signal levels (X1, X2 and X3) which are previously stored therein with the detection signal X, and the process proceeds to prescribed steps (steps S106 to S110) depending on the compared results. If the detection signal X is larger than X1, the process returns to step S102 without changing the operation time period tA of the microwave generating device 17. Then, after the predetermined waiting period has elapsed, the microwave power amount is detected. If the detection signal X is equal to or smaller than X1, and larger than X2, the process returns to step S102 after setting the operation time period of the microwave generating device 17 to be tB (tB<tA, e.g., 20 minutes) at step S108. If the detection signal X is equal to or smaller than X2, and larger than X3 corresponding to the trapped amount for starting the filter regeneration, the process returns to step S102 after setting the operation time period to be tC (tC<tB, e.g., 10 minutes) at step S110. In this way, as the trapped amount increases, the detecting period of the detecting signal is shortened, so as to ensure detection accuracy.

If the detection signal X is equal to or smaller than X3, the process proceeds to step S111 in which the preparation for regenerating the filter 16 is started. Specifically, the switching valve 23 is controlled to allow the exhaust gas to flow through the by-pass pipe 24. Thereafter, in step S112, the microwave generating device 17 is continuously operated, so that the particulate trapped in the filter 16 is dielectric-heated by the microwave. In the dielectric heating period of the particulate by the microwave, the flow of the gas through the filter 16 is suppressed.

With the continuous supply of the microwave to the heating chamber 15, the dielectric heating of the particulate progresses, so that the dielectric loss in the filter 16 is increased. The loss has a tendency to increase toward the supplying position (i.e., coupling holes 20 and 21). The region in which the loss is increased is expanded in the direction toward the inside of the filter 16 (i.e., to the remote side from the supplying position) as the heating time increases. After an appropriate time has elapsed, the loss in the filter 16 in the region in which the detecting section 31 is located is increased. Thus, the microwave power amount in the vicinity of the detecting section 31 is reduced. Based on the amount of particulate trapped in the filter 16 obtained by the detection signal, it is possible to estimate the temperature of the heated particulate. In addition, it is possible to estimate the region where the particulate at the temperature capable of being burnt exists. If the detection signal attains a level which indicates that the region capable of burning the particulate reaches a desired region, the gas containing oxygen for facilitating the burning is allowed to flow into the filter 16. By the start of the gas supply, the heated particulate is changed into a burning condition, and the succeeding supply of microwave and gas can expand the burning region to the entire filter 16.

The detection signal X detected in the above dielectric heating period is further compared with a signal X4 stored in the control device 33 (steps S113 and S114). The stored signal X4 corresponds to a signal indicative of the time at which the supply of gas containing oxygen is to be started into the filter 16 for facilitating the burning of the heated particulate. The temperature of the particulate is effectively increased to the temperature range capable of being burnt by the dielectric heating with microwave, under a condition that the burning of the particulate is suppressed by the exhaust gas flowing through the filter 16. At this time, the temperature distribution in the filter has a tendency that the temperature is higher toward the end portion of the filter 16 from which the microwave is radiated. The heating is continuously performed substantially until about half the region of the filter 16 reaches the temperature range capable of being burnt. Due to the increase in dielectric loss caused by the temperature rise of particulate and the increase in temperature of the filter material caused by the heat generation of particulate, the dielectric loss of the filter material is increased, and the detection signal X is decremented. If it is determined that the detection signal X becomes equal to or smaller than the stored signal X4, the process proceeds to step S115 in FIG. 8B.

In step S115, the gas containing oxygen is supplied into the filter 16. In the apparatus shown in FIG. 1, the exhaust gas is used as the gas containing oxygen. The control device 33 controls the valve 27 to be opened, and controls the valve 26 to be opened so as to have an appropriate opening ratio according to the rotation rate of the internal combustion engine. As a result, part of the exhaust gas is allowed to flow into the filter 16 through the second opening 61 and to effectively facilitate the burning of the heated particulate.

The detection signal is changed to increase by the change of the particulate condition into the burning condition. Thus, based on the increasing signal, the change of the particulate condition into the burning condition can be confirmed.

The burning of the particulate is expanded over the entire filter 16 by the supply of gas. Also in this particulate burning step, the microwave power is appropriately detected (step S116).

When the particulate enters into the burning condition, the particulate is gradually removed, so that the amount of particulate trapped in the filter 16 is reduced. Accordingly, the signal detected by the microwave detecting device 29 is increased. Immediately after the particulate is completely removed, the filter 16 itself is still at a high temperature, and hence the filter 16 also absorbs the microwave. Thus, the signal detected by the microwave detecting device 29 has a reduced value as compared with the initial value before the trapping. Considering the change of the detection signal and the burning progress condition of particulate, it is possible to specify the region where particulate remains unremoved and the unremoved amount of particulate. The specified region and amount correspond to the region and amount where the temperature of the particulate existing in the filter 16 substantially reaches the temperature capable of being burnt independently of the microwave heating, and such region and amount are prescribed. The control device 33 previously stores the level of the detection signal from the microwave detecting device 29 corresponding to the specified region and amount. The detection signal detected by the microwave detecting device 29 during the burning of particulate indicates the burning region of particulate in the filter 16 at the detection. The control device 33 stops the operation of the microwave generating device 17 when the level of the detection signal reaches the level corresponding to the specified region and amount. As described above, by immediately stopping the operation of the microwave generating device 17 at an optimal time, the power can be optimally used. This attains a practical effect when the power supply of the mobile engine of an automobile or the like is utilized.

In step S117, the control device 33 compares the detection signal X with the signal level X5 which is previously stored in the control device 33. The signal level X5 has a level which is equal to the level of the detection signal corresponding to the amount of particulate which can be burnt by its temperature without being heated by the microwave, after almost all the particulate trapped in the filter 16 is burnt and removed. Accordingly, if the detection signal X becomes equal to or larger than X5, the control device 33 stops the operation of the microwave generating device 17, and the process proceeds to step S118. Thereafter, the gas is continuously supplied for a previously stored time period tD (e.g., 10 minutes) (steps S119 and S120).

In this period for supplying only the gas, the burning of particulate in the filter 16 which is in the burning condition is finished, and the burning in the filter 16 is completely extinguished. Thereafter, the filter 16 which is at a high temperature by the particulate burning heat is gradually cooled by the flow of exhaust gas. After a predetermined gas supplying period has elapsed, the control device 33 controls the valves 26 and 27 to be opened and closed, respectively, at step S121.

Thereafter, the operation of the microwave generating device 17 is started again at step S122. When the detection signal X is detected at step S123, the operation of the microwave generating device 17 is stopped at step S124. Then, the process proceeds to step S125 where the currently detected detection signal X is compared with a signal level X6 which is previously stored in the control device 33. The signal level X6 corresponds to the level indicative of the amount of particulate which can remain in the filter 16 after the filter regeneration. If the detection signal X is equal to or larger than X6, it is determined that the filter regeneration is properly performed, and the process proceeds to step S126. In step S126, the switching valve 23 is switched, and the process returns to step S100. Then, the exhaust gas is allowed to flow through the filter 16 and the particulate included in the exhaust gas is trapped. On the other hand, if the detection signal X is smaller than X6, it is determined that there is too much of particulate remaining in the filter, so that the warning device 43 warns the user of the regeneration failure as the abnormal occurrence in step S127. By this warning, the user performs the maintenance of the apparatus, and the initial setting in step S100 is performed. Thereafter, the above-described control for trapping and regenerating is implemented.

EXAMPLE 2

Figure 9:
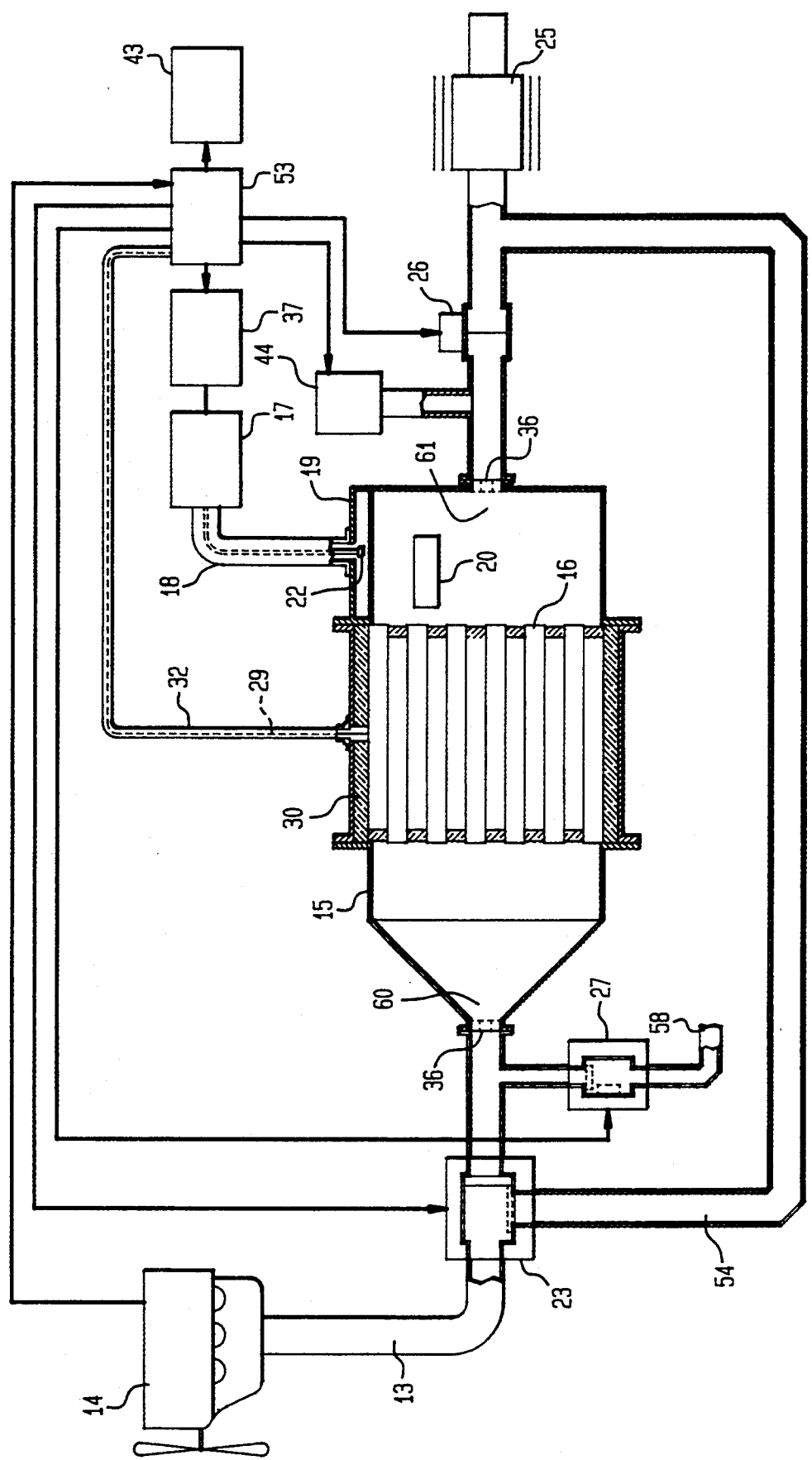
FIG. 9 shows the construction of a filter regenerating apparatus for an internal combustion engine in a second example of the invention.

The second example according to the invention will be described with reference to FIG. 9. In FIG. 9, identical components are indicated by identical reference numerals with those in the first example. In the first example, the exhaust gas serves as the gas containing oxygen for facilitating the burning of the heated particulate. In the second example, the atmospheric gas (the air in the atmosphere) introduced from the outside of the apparatus is used for the gas as the secondary air. In the second example, the apparatus includes an air supplying device 44 for supplying the secondary air to the filter 16 through the second opening 61. The air supplying device 44 is formed of a compressor. The air supplying device 44 can also be formed of a pump or the like. The air supplying device 44 may supply the compressed air to the filter 16. The operation of the air supplying device 44 is controlled by a control device 53. A by-pass pipe 54 is connected between a valve 26 of the exhaust pipe and the muffler 25. During the filter regeneration, the secondary air supplied from the air supplying device 44 to the heating chamber 15 is discharged to the atmosphere through the second opening 61, the filter 16, the first opening 60, and an exhaust pipe 58.

Next, the method for regenerating the filter 16 in the second example will be described with reference to FIGS. 10 and 11.

Figure 10:
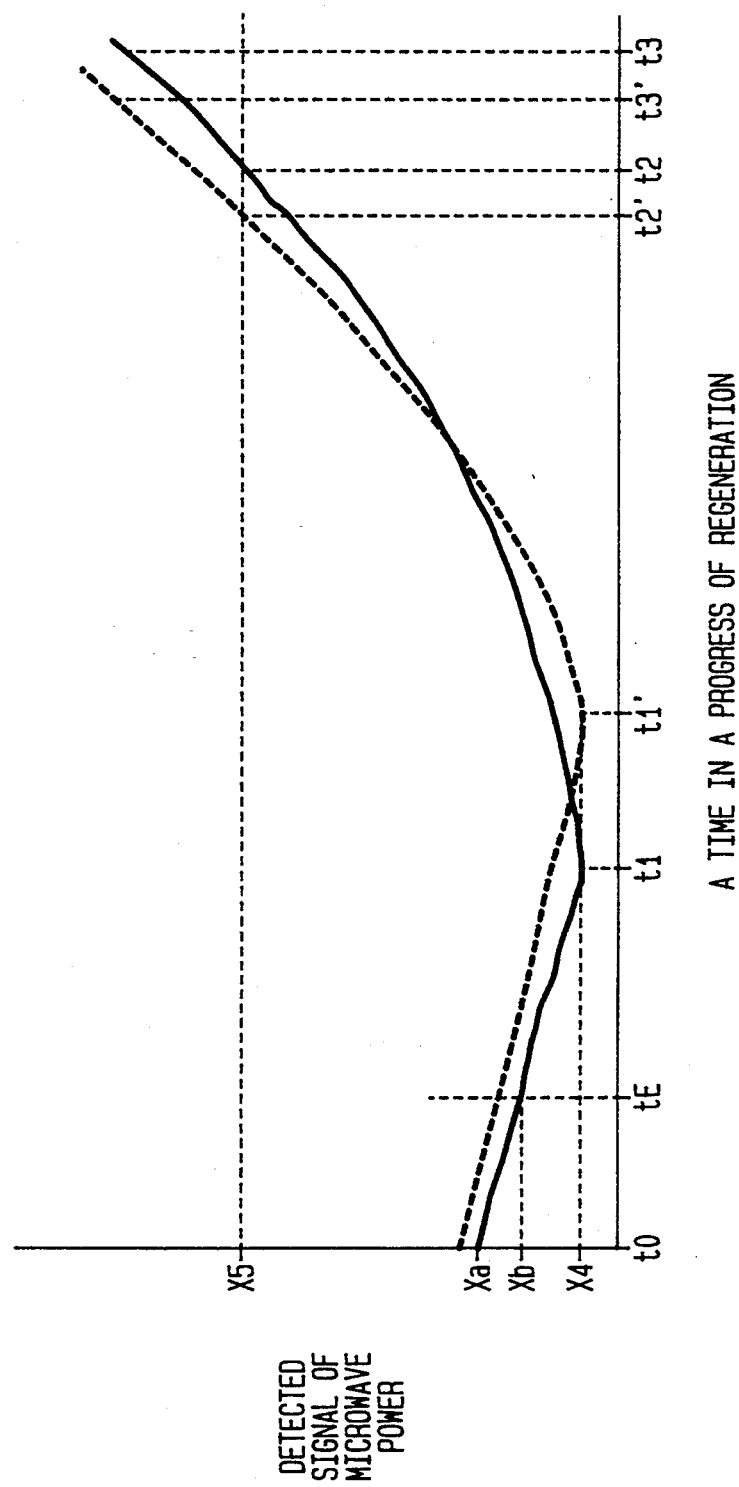
FIG. 10 shows the control method in the regeneration of the filter used for an internal combustion engine and the characteristics of the detected signal of the microwave power for the second example of the invention.
Figure 11:
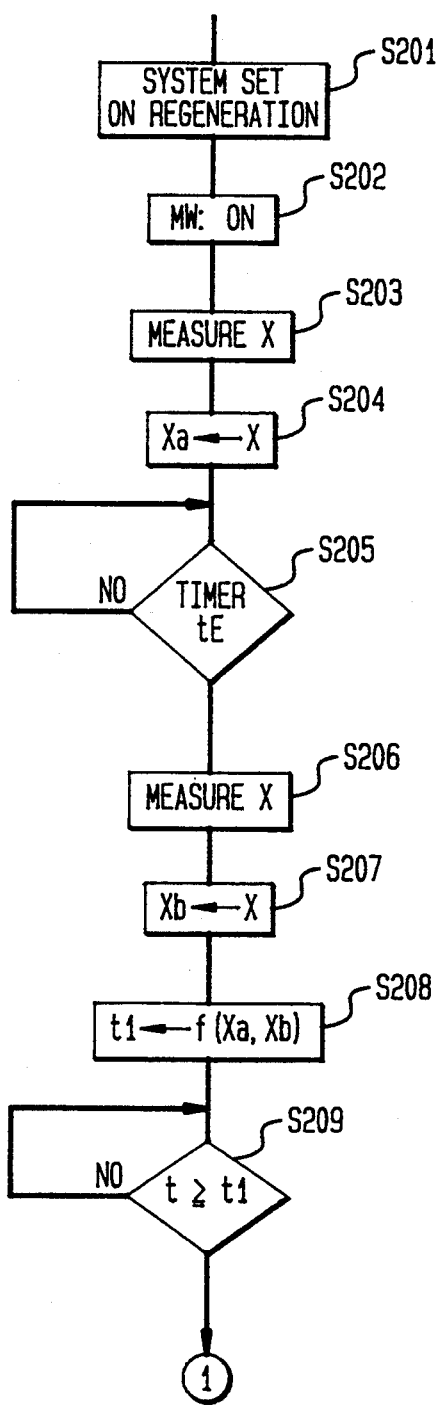
FIG. 11 is a flowchart showing the control program for the regeneration of the filter used for the internal combustion engine in the second example of the invention.
Figure 12:
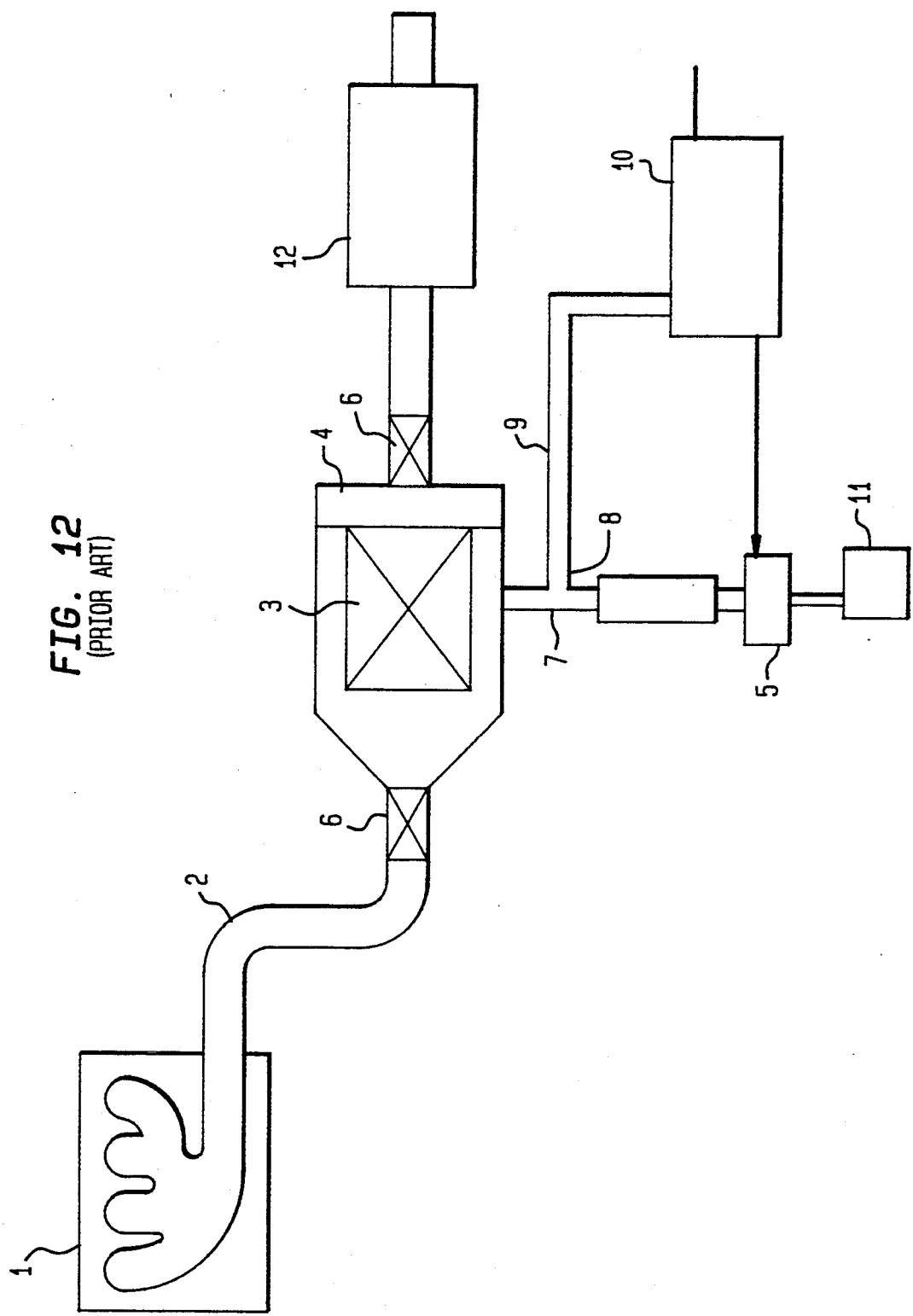
FIG. 12 shows the construction of a conventional filter regenerating apparatus for an internal combustion engine.

FIG. 10 illustrates the timing at which the microwave detecting device 29 in the second example detects the microwave power. In the second example, the timing for supply of the secondary air is determined based on the detection signals Xa and Xb which are detected at different times during the dielectric heating of the particulate by microwave. The detection signal Xb is detected after a predetermined time interval tE following the detection of the detection signal Xa at time t0. The predetermined time interval tE is set to be 5 minutes in this example. The control device 53 calculates the time t1 required for the value of the detection signal X to reach the value of the stored signal X4, based on the change from the detection signal Xa to the detection signal Xb. The control device 53 controls the valves 23, 27 and 26, and controls the air supplying device 44 to operate at the time t1, so as to allow the secondary air to flow into the filter 16.

Next, the flow of the filter regeneration according to the second example will be described with reference to FIG. 11. In the filter regeneration according to the second example, steps S201 to S209 described below are substituted for steps S111 to S114 shown in FIGS. 8a and 8B in the first example. The other steps are identical with those in the filter regeneration in the first example.

In step S201, the control device 53 switches the switch valve 23, so as to allow the exhaust gas to flow through the by-pass pipe 54. At this time, the control device 53 controls the valve 26 to be closed. In step S202, the control device 53 controls the microwave generating device 17 to operate, so as to supply the microwave to the filter 16. In step S203, the microwave detecting device 29 detects the microwave power at time t0. In step S204, the control device 53 stores the microwave power detected at time t0 as the detection signal Xa. After the apparatus waits for the predetermined time interval tE at step S205, the microwave detecting device 29 detects the microwave power again at time tE (step S206). In step S207, the control device 53 stores the microwave power detected at time tE as the detection signal Xb. In step S208, the control device 53 calculates the time t1 required for the value of the detected signal to reach the value of the stored signal X4, based on the change from the detection signal Xa to the detection signal Xb. In step S209, the apparatus waits for the time t1 obtained in step S208, and the process proceeds to step S115 (FIG. 8B). The control device 53 controls the valve 27 to be opened, and controls the air supplying device 44 to operate, so as to supply the secondary air to the filter 16. The succeeding operation of the apparatus is the same as described in the first example.

In plural filter regenerating operations of the second example, even though the microwave power values detected at time t0 are equal to each other, the succeeding detection signals may exhibit different time sequential changes, depending on the nature of particulate trapped by the filter, the distribution of the trapped matter, and the like. According to the second example, the time sequential change of the microwave power can be estimated by measuring the microwave power twice at different times during the progress of heating of particulate. Therefore, the time t1 at which the supply of the secondary air is started can be appropriately determined in accordance with the heating progress condition of the particulate. Specifically, in accordance with the change in dielectric loss along with the microwave dielectric heating of particulate before the start of the secondary air supply, the start time for supplying the secondary air is determined. In FIG. 10, the solid line indicates the case where the change in the dielectric loss of particulate is fast, and the broken line indicates the case where the change is slow. In the case where the change in the dielectric loss is slow, the start time for supplying the secondary air is delayed as compared with the case where the change in the dielectric loss is fast (t1 < t1').

In the second example, the microwave power is detected twice at different times during the heating of particulate in order to estimate the change of microwave power. However, the number of detection times is not limited to two. Alternatively, the detection may be performed three or more times.

In the second example, the control device 53 determines the time t2 for stopping the operation of the microwave generating device 17, in accordance with the progress of burning of particulate after the air supply. That is, if the particulate is burnt fast, the detection signal reaches the predetermined value X5 earlier than in the case where the particulate is burnt slow (t2 > t2'). At times t2 and t2', the control device 53 stops the operation of the microwave generating device 17. Thereafter, the air supplying device 44 is operated for a predetermined time. At time t3 and t3', the operation of the air supplying device 44 is stopped.

It is appreciated that the regenerating apparatus and the control method for the apparatus in the above-described first and second examples can be used in variously combined ways. For example, the method for determining the start time for supplying the secondary air in the second example can be used for determining the start time of introducing the exhaust gas for facilitating the particulate heating in the first example. In addition, the method for determining the start time of introducing the exhaust gas for facilitating the particulate heating in the first example can be used for determining the start time for supplying the secondary air in the second example.

Moreover, in the by-pass pipe 24 in the first example and in the by-pass pipe 54 in the second example, a filter for trapping particulate can be provided. In such a case, the filter regenerating method described in the first and second examples can be applied to the filter provided in the by-pass pipe.

According to the filter regenerating apparatus of the invention, the following effects can be attained.

(1) The detecting section of the microwave detecting device is surrounded by the thermally insulating member in the space through which the exhaust gas does not pass, so that the detecting section will not be polluted by the exhaust gas, and the detecting section can be protected by the heat of the exhaust gas. Therefore, the detecting section can always accurately detect the microwave power corresponding to the amount of particulate trapped by the filter, so that the control device can properly control the microwave generating device, the air supplying device, and the several valves.

(2) Since the period for detecting the microwave power can be varied, and especially the period is shortened as the detection signal comes close to the predetermined value, the distribution and the change of microwave power in the heating chamber can be accurately transmitted to the control device via the detection signal. As a result, the control device can control the microwave generating device, the air supplying device, and the several valves at appropriate times based on the accurately measured amount of particulate deposited on the filter, the burning condition, and the burning region.

(3) The microwave power can be detected at a plurality of different times, so that the distribution and the change of microwave power in the heating chamber can be accurately transmitted to the control device via the detection signal. As a result, the control device can control the microwave generating device, the air supplying device, and the several valves at appropriate times based on the accurately measured amount of particulate deposited on the filter, the burning condition, and the burning region.

(4) Since the microwave detecting device includes the coaxial line and the detecting section is formed of a central conductor of the coaxial line, the device can easily be attached to the heating chamber. Thus, the apparatus can have a simple structure and can be inexpensive.

For the above reasons, according to the filter regenerating apparatus of this invention, the particulate or the like included in the exhaust gas trapped by the filter can be surely and efficiently removed at an appropriate time. In addition, according to the filter regenerating apparatus of this invention, the stop of burning and the abnormally high temperature burning of the particulate can be avoided during the filter regeneration, so that the mechanical damage of the apparatus can be prevented, and lowering of the power of the engine and the stopping of the engine can be also prevented. Moreover, the filter regenerating apparatus of the invention can efficiently regenerate the filter, so that the electric power consumption for the filter regeneration can be minimized. The filter regenerating apparatus of this invention has a simple structure, so that the assembly and repairing of the apparatus can be easily performed, and the apparatus can be produced at a low cost. As a result, the apparatus of this invention is suitable for being mounted on an automobile. Furthermore, the apparatus of this invention judges the amount of particulate which is not burnt and left unremoved. Thus, when a burning failure of particulate occurs, the apparatus can immediately warn the user of the abnormal occurrence. Therefore, the user can perform the maintenance of the apparatus at an appropriate time.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A filter regenerating apparatus for an internal combustion engine comprising:

a heating chamber having a first opening portion and a second opening portion;

a filter for trapping particulate matter included in the exhaust gas which is discharged from an internal combustion engine and flows into the heating chamber via the first opening portion;

microwave generating means for generating microwave supplied to the heating chamber;

microwave detecting means having a detecting section for detecting the power of the microwave supplied to the heating chamber, the microwave detecting means outputting a detection signal in accordance with the detected power; and control means for controlling the microwave generation of the microwave generating means in accordance with the detection signal, wherein the heating chamber includes a space into which no exhaust gas flows, the filter is supported against a wall of the heating chamber by a support portion having a heat insulating member, the support portion being positioned in the space into which no exhaust gas flows, and the detecting section of the microwave detecting means is located in the support portion.

2. A filter regenerating apparatus according to claim 1, further comprising air supplying means for supplying a gas containing oxygen to the heating chamber via the second opening portion, wherein the control means controls the air supplying means to supply the gas to the heating chamber in accordance with the detection signal.

3. A filter regenerating apparatus according to claim 2, wherein the gas supplied by the air supplying means is the exhaust gas discharged from the internal combustion engine.

4. A filter regenerating apparatus according to claim 2, wherein the air supplied by the air supplying means is an atmospheric gas existing on the outside of the apparatus, and the air supplying means supplies the atmospheric gas to the heating chamber without passing through the internal combustion engine.

5. A filter regenerating apparatus according to claim 2, wherein the microwave detecting means outputs the detection signal several times before the air supplying means is started and when the microwave generating means generates the microwave, and wherein the control means starts the air supplying means when the detection signal substantially coincides with a predetermined value.

6. A filter regenerating apparatus according to claim 5, wherein the control means stores at least one predetermined value, and the microwave detecting means detects the power of microwave at a period which is shortened as the detection signal comes close to the predetermined value.

7. A filter regenerating apparatus according to claim 5, wherein the control means determines a time at which one of the detection signals substantially coincides with the predetermined value based on the detection signals, and starts the air supplying means at the time.

8. A filter regenerating apparatus according to claim 1, further comprising abnormal occurrence warning means for generating a warning signal,
wherein the abnormal occurrence warning means generates the warning signal under the control of the control means when the detection signal does not fall within a predetermined range.

9. A filter regenerating apparatus according to claim 1, wherein the microwave detecting means has a coaxial line, and the detecting section is formed of a central conductor of the coaxial line.

10. A method for removing particulate matter from a filter, used in a filter regenerating apparatus for an internal combustion engine comprising: the filter for trapping the particulate matter included in the exhaust gas which is discharged from the internal combustion engine; microwave generating means for generating microwave for heating the filter; microwave detecting means for detecting the power of the microwave which changes depending on the amount of particulate trapped by the filter; and control means for controlling the microwave generation of the microwave generating means, the method comprising:
a first stage for dielectric-heating the particulate trapped in the filter by the microwave;
a second stage for burning the particulate by supplying a gas containing oxygen to the filter, while heating the filter by the microwave; and
a third stage for stopping the heating of the filter by the microwave, and then supplying the air containing oxygen to the filter.

11. A method according to claim 10, wherein the control means commences the second stage based on the power of the microwave detected by the microwave detecting means in the first stage.

12. A method according to claim 11, wherein the control means commences the third stage based on the power of the microwave detected by the microwave detecting means in the second stage.

* * * * *